United States Patent
Xiao et al.

(10) Patent No.: US 11,366,059 B2
(45) Date of Patent: Jun. 21, 2022

(54) SYSTEM AND METHOD TO MEASURE REFRACTIVE INDEX AT SPECIFIC WAVELENGTHS

(71) Applicant: Applied Materials, Inc., Santa Clara, CA (US)

(72) Inventors: Wen Xiao, Singapore (SG); Vibhu Jindal, San Jose, CA (US); Huajun Liu, Singapore (SG); Herng Yau Yoong, Singapore (SG)

(73) Assignee: Applied Materials Inc., Santa Clara, CA (US)

( * ) Notice: Subject to any disclaimer, the term of this patent is extended or adjusted under 35 U.S.C. 154(b) by 243 days.

(21) Appl. No.: 16/893,547

(22) Filed: Jun. 5, 2020

(65) Prior Publication Data

US 2021/0381967 A1    Dec. 9, 2021

(51) Int. Cl.
*G01N 21/41* (2006.01)
*G02B 5/18* (2006.01)

(52) U.S. Cl.
CPC ....... *G01N 21/4133* (2013.01); *G02B 5/1861* (2013.01)

(58) Field of Classification Search
CPC ....... G01N 21/4133; G01N 2021/4126; G01N 2021/8438; G01N 21/8422; G02B 5/1861
USPC ...................................................... 250/372
See application file for complete search history.

(56) References Cited

U.S. PATENT DOCUMENTS

| | | | | |
|---|---|---|---|---|
| 7,002,695 | B2* | 2/2006 | Feldman | G01N 21/95607 356/516 |
| 7,310,153 | B2* | 12/2007 | Kiesel | G01J 9/0246 356/519 |
| 7,949,217 | B2* | 5/2011 | Glebov | G02F 1/2955 385/47 |
| 10,421,151 | B2* | 9/2019 | Li | B23K 26/00 |
| 2006/0029866 | A1* | 2/2006 | Schwarzl | B82Y 10/00 430/5 |
| 2006/0251973 | A1 | 11/2006 | Takaki et al. | |
| 2015/0144798 | A1* | 5/2015 | Shi | G01B 11/02 250/372 |
| 2016/0011500 | A1* | 1/2016 | Hassan | G03F 1/38 430/5 |
| 2016/0011502 | A1* | 1/2016 | Hofmann | G02B 1/14 430/5 |
| 2016/0109792 | A1* | 4/2016 | Mikami | G03F 1/24 430/5 |

(Continued)

FOREIGN PATENT DOCUMENTS

| JP | H11211660 A | 8/1999 |
|---|---|---|
| JP | 2018180544 A | 11/2018 |

OTHER PUBLICATIONS

PCT International Search Report and Written Opinion in PCT/US2021/034146 dated Sep. 17, 2021, 10 pages.

(Continued)

*Primary Examiner* — David P Porta
*Assistant Examiner* — Gisselle M Gutierrez
(74) *Attorney, Agent, or Firm* — Servilla Whitney LLC

(57) ABSTRACT

Apparatus, methods and are disclosed for measuring refractive index of a material film. The method and apparatus utilize a reference measurement and as series of reflectance measurements at a range of wavelengths and thickness values for the material film to determine the refractive index of the material film.

20 Claims, 4 Drawing Sheets

(56) References Cited

U.S. PATENT DOCUMENTS

| | | | |
|---|---|---|---|
| 2017/0271131 A1* | 9/2017 | Moffatt | C30B 29/36 |
| 2018/0299766 A1* | 10/2018 | Tanabe | G03F 1/54 |
| 2019/0285989 A1* | 9/2019 | Enkisch | G03F 7/70958 |
| 2019/0352774 A1* | 11/2019 | Chan | H01J 37/32871 |
| 2019/0384156 A1* | 12/2019 | Tanabe | G03F 1/80 |
| 2020/0333700 A1* | 10/2020 | Xiao | G03F 7/70316 |
| 2021/0033770 A1* | 2/2021 | Lu | G03H 1/04 |
| 2021/0366976 A1* | 11/2021 | Chen | H01L 27/14685 |
| 2021/0382398 A1* | 12/2021 | Xiao | G03F 1/84 |

OTHER PUBLICATIONS

PCT International Search Report and Written Opinion in PCT/US2021/034148 dated Sep. 16, 2021, 9 pages.

* cited by examiner

SYSTEM AND METHOD TO MEASURE REFRACTIVE INDEX AT SPECIFIC WAVELENGTHS

TECHNICAL FIELD

The present disclosure relates generally to refractive index measurement, and more particularly, to systems and methods of measuring the refractive index at specific wavelength ranges of materials, for example thin material films.

BACKGROUND

The refractive index (n) of a material, for example, a thin film of a material, is a property of interest for applications in optical instruments and devices. High refractive index materials are used for lenses, optical circuits, optical fibers, antireflective films and coatings, optical adhesives, displays such as liquid crystal displays (LCD), waveguides, and other devices Low refractive index materials are used for optical fiber cores and claddings, optical lens coatings, antireflective coatings, optical adhesives, encapsulation of various optical components such as light guides, patterning, or hetero layer device fabrication which includes several layers of materials, at least one material layer being different from another material layer. One way of measuring refractive index (n) of thin films is by spectroscopic ellipsometry, which measures change in light polarization, including amplitude and phase. An example of a spectroscopic ellipsometry system 100 is shown in FIG. 1 and uses a linearly polarized incident light 118 from a light source 112 directed through a polarizer 114 directed and at a sample 116. Reflected light 119 reflected from the sample 116 is captured by a rotating analyzer 120 and a light detector 124. The system can measure output intensity of the reflected light 119 at the detector 124 as a function of polarization angle.

Current spectroscopic ellipsometry systems have disadvantages due to the difficulty to measure thin films having a thickness less than 10 nm. For example, in many instances, an ultrathin layer having a thickness less than 10 nm and substrate cannot be differentiated from one another. The current spectroscopic ellipsometry systems require an oblique incident angle of the incident light for measuring the refractive index (n) (e.g. 70-80° in semiconductor field). Not only is it difficult to optimize incident angle for materials with multiple phases or amorphous materials, but also difficult to measure thin films with a small light absorption coefficient (e.g., less than 100 $cm^{-1}$).

Accordingly, a device and a method are needed to measure refractive index n of thin films that are also suitable for thin films having a wide range of thickness (e.g., ranging from 1 nm to 50 μm) and for thin films having a wide light absorption coefficient (e.g., ranging from 10 $cm^{-1}$ to $10^5$ $cm^{-1}$), and a flexible incident light angle (e.g. ranging from 0° to 85°).

SUMMARY

One or more embodiments of the disclosure are directed to an apparatus to measure a refractive index of a material film, the apparatus comprising: a first light probe comprising a first distributed Bragg reflector which reflects light having a wavelength in a range of from 50 nm to 50 μm; a second light probe comprising a second distributed Bragg reflector which reflects light having a wavelength in a range of from 50 nm to 50 μm; a material film having a thickness t disposed between the first light probe and the second light probe, the first light probe, the material film and the first light probe on a substrate having a surface; a light source positioned at an angle θ with respect to a plane normal to a surface the substrate and configured to direct incident light having a wavelength in a range of from 50 nm to 50 μm toward the first light probe; a light detector positioned to detect a first light beam reflected from the first light probe and a second light beam transmitted through the material film and reflected from the second light probe; and a processor configured to determine the refractive index of the material film.

Additional embodiments of the disclosure are directed to a method of measuring the refractive index of a material film, the method comprising: positioning a light source with respect to a substrate having formed on a surface of the substrate: a first light probe comprising a first distributed Bragg reflector which reflects light; a second light probe comprising a second distributed Bragg reflector which reflects light having a wavelength in a range of from 50 nm to 50 μm; and a material film having a thickness t between the first light probe and the second light probe, the first light probe, the material film and the first light probe on a substrate having a surface. The method further comprises directing incident light toward the first light probe, the incident light directed at an angle θ with respect to a plane normal to the surface of the substrate; detecting light with a light detector positioned to detect a first light beam reflected from the first light probe and a second light beam transmitted through the material film and reflected from the second light probe; and calculating the refractive index of the material film.

In a third aspect, a non-transitory computer-readable storage medium including instructions, that, when executed by a processor of an apparatus to measure the refractive index of a material film, causes the apparatus to perform the operations of: positioning a light source with respect to a substrate having formed on a surface of the substrate: a first light probe comprising a first distributed Bragg reflector which reflects light having a wavelength in a range of from 50 nm to 50 μm; a second light probe comprising a second distributed Bragg reflector which reflects light having a wavelength in a range of from 50 nm to 50 μm; and a material film having a thickness t disposed between the first light probe and the second light probe, the first light probe, the material film and the first light probe on a substrate having a surface. The operations further comprise directing incident light toward the first light probe, the incident light directed at an angle θ with respect to a plane normal to the surface of the substrate; detecting light with a light detector positioned to detect a first light beam reflected from the first light probe and a second light beam transmitted through the material film and reflected from the second light probe; and calculating the refractive index of the material film.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

The term "horizontal" as used herein is defined as a plane parallel to the plane or surface of a mask blank, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures.

The term "on" indicates that there is direct contact between elements. The term "directly on" indicates that there is direct contact between elements with no intervening elements.

Those skilled in the art will understand that the use of ordinals such as "first" and "second" to describe process regions do not imply a specific location within the processing chamber, or order of exposure within the processing chamber.

As used in this specification and the appended claims, the term "substrate" refers to a surface, or portion of a surface, upon which a process acts. It will also be understood by those skilled in the art that reference to a substrate can refer to only a portion of the substrate, unless the context clearly indicates otherwise. Additionally, reference to depositing on a substrate can mean both a bare substrate and a substrate with one or more films or features deposited or formed thereon.

Figure 1:
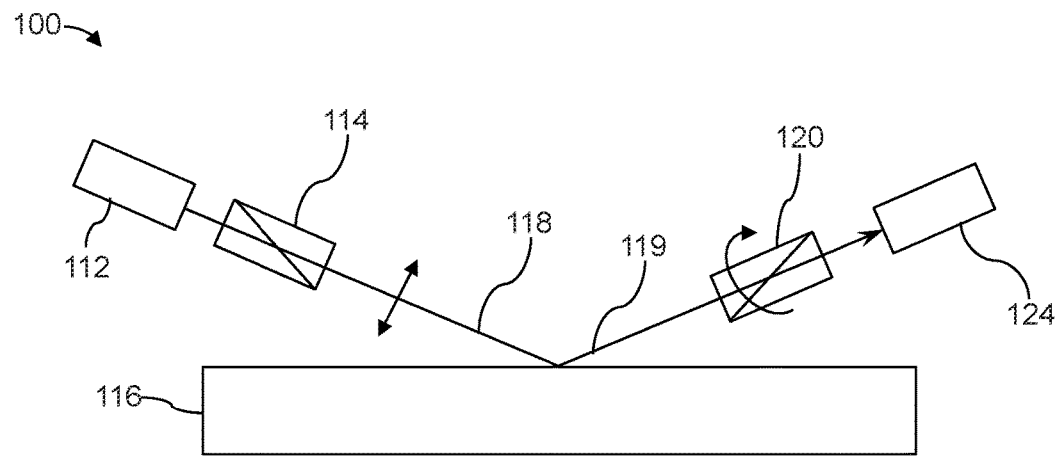
FIG. 1 illustrates a prior art refractive index measurement system.
Figure 2:
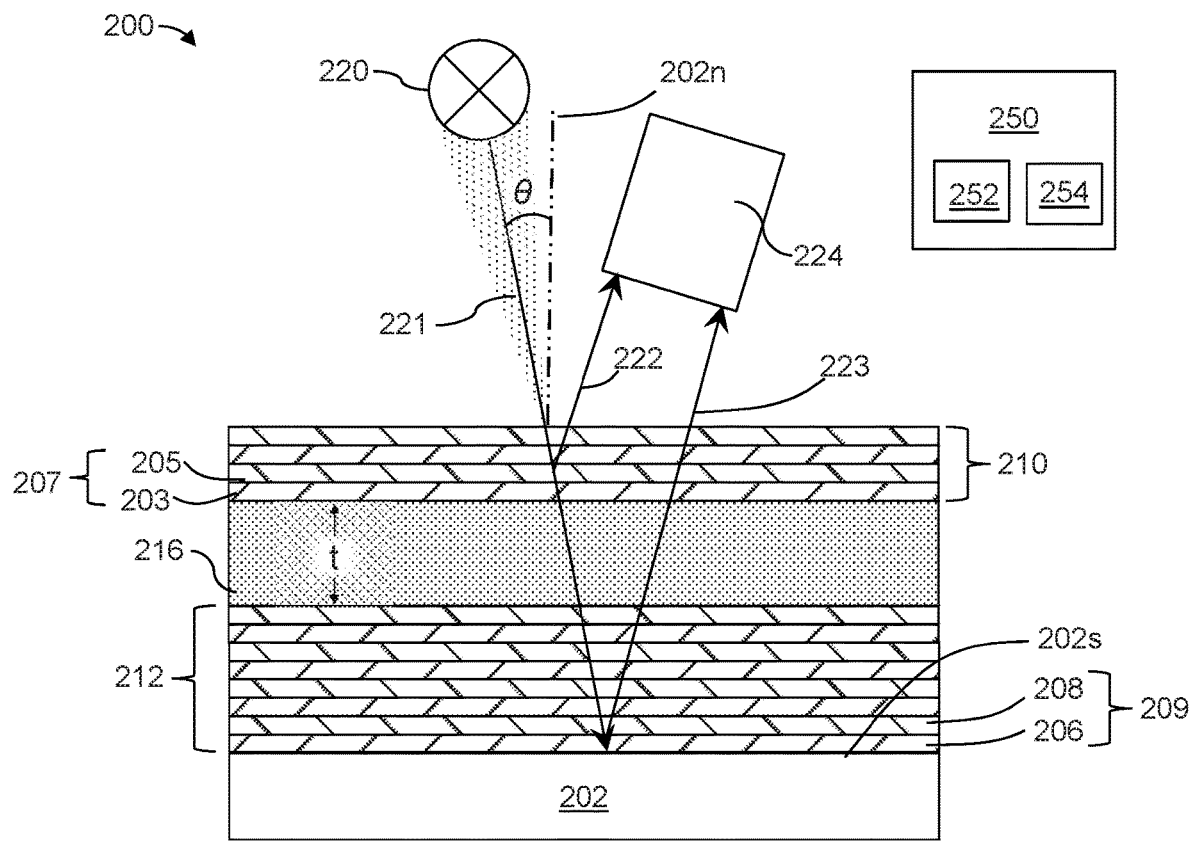
FIG. 2 schematically illustrates an embodiment of a measurement system for measuring refractive index of a material film.

Referring now to FIG. 2, an exemplary embodiment of a system or apparatus 200 for measuring refractive index n of a material film 216 at a specified wavelength or a specified range of wavelengths is shown. In one or more embodiments of the disclosure, the system or apparatus 200 comprises a light source 220, the material film 216, a first light probe 210 which reflects light having a wavelength in a range of from 50 nm to 50 μm and a second light probe 212 which reflects light having wavelength in a range of from 50 nm to 50 μm, a substrate 202, and a light detector 224. In the embodiment shown, the material film 216 is positioned between the first light probe 210 and the second light probe 212. In the embodiment shown the first light probe 210 is positioned over the material film 216, and the material film 216 is positioned over the second light probe 212. In specific embodiments, the first light probe 210 is directly above and in direct contact with the material film 216, the material film 216 is directly above and in direct contact with the second light probe 212. The second light probe is on the substrate 202 shown as being directly below and in direct contact with the second light probe 212 In specific embodiments, the material film 216 is sandwiched between the first light probe 210 and the second light probe. In the embodiment shown, the first light probe 210 is a top light probe and the second light probe 212 is a bottom light probe as shown in the exemplary embodiment of FIG. 2.

The light source 220 is positioned such that the light source 220 directs light at the first light probe 210. The light detector 224 is positioned to receive light reflected from the first light probe 210 and the second light probe 212. In the configuration shown in FIG. 2, the light source 220 and the light detector 224 are positioned above the first light probe 210. However, it will be understood that the configuration shown in FIG. 2 could be reversed such that the first light probe 210 is a bottom light probe, the second light probe 212 is a top light probe, the substrate 202 is the top most structure, and the light source 220 and the light detector 224 are positioned below the first light probe 210.

The light source 220 can be any suitable light source that generates light having a wavelength in a range of from 50 nm to 50 μm. For example, the light source 220 according to one or more embodiments comprises a laser-produced plasma (LPP) source, a $CO_2$ laser, or a discharge-produced plasma (DPP) source. The light detector 224 according to one or more embodiments comprises a charge-coupled device (CCD) detector or a silicon-based p-n junction photodiode. In one or more embodiments, the light detector 224 is configured to measure reflection of light intensity or reflectance as a function of wavelength. In some embodiments, the light detector 224 is configured to measure intensity of light at desired wavelength range, and may comprise a grating or other filtering mechanism to measure within the range of from 50 nm to 50 μm.

In one or more embodiments, the light source 220 generates incident light 221 having a wavelength in a range of from 50 nm to 50 μm directed at the first light probe as shown in FIG. 2 within a wavelength range, for example, in a range of from 50 nm to 50 μm or in a range of from 100 nm to 50 μm. In one or more embodiments of the disclosure, the light source 220 directs incident light 221 to the substrate at angle θ with respect to a plane normal to the surface 202s of the substrate 202. The angle θ according to one or more embodiments is in a range of from 0 degrees to 85 degrees, for example, from 5 degrees to 75 degrees, or from 5 degrees to 65 degrees, or from 5 degrees to 50 degrees, or from 5 degrees to 35 degrees, or 5 degrees to 20 degrees, or from 10 degrees to 50 degrees or from 10 degrees to 40 degrees or from 10 degrees to 30 degrees, or from 15 degrees to 50 degrees or from 15 degrees to 40 degrees with respect to a plane 202n normal to the surface 202s of the substrate.

In one or more embodiments of the disclosure, the substrate 202 comprises any suitable material. In one embodiment, the substrate 202 comprises a silicon wafer. In other embodiments, the substrate 202 comprises quartz or a substrate having very low thermal expansion, for example, ultra low thermal expansion glass (e.g., ULE® glass available from Corning, Inc. or Zerodur® low expansion lithium aluminosilicate glass). In one or more embodiments, the substrate surface 202s has a surface roughness of less than or equal to 0.03 nm.

In one or more embodiments of the disclosure, the second light probe 212 is disposed on a substrate 202. In exemplary embodiments of the disclosure the second light probe 212 is comprises a second distributed Bragg reflector (DBR) 209 which reflects Light having a wavelength in a range of from 50 nm to 50 µm or in a range of from 100 nm to 50 µm. In some embodiments of the disclosure, the second light probe comprises multilayers including a range of 10-40 bilayers or 20 to 40 total layers. In an exemplary embodiment of the disclosure, the second DBR 209 comprises bilayers including a first reflective layer 206 (e.g., molybdenum (Mo)) and a second reflective layer 208 (e.g., silicon (Si)). In one embodiment, the first reflective layer 206 comprises tungsten (W) and the second reflective layer 208 comprises boron carbide ($B_4C$). In other embodiments, other combinations of materials can interchangeably be used to form the first reflective layer 206 and the second reflective layer 208. For example, in one embodiment, boron carbide ($B_4C$) can be the first reflective layer 206 and tungsten (W) can comprise of the second reflective layer 208. In another embodiment, the first reflective layer 206 and the second reflective layer can respectively comprise chromium (Cr) and scandium (Sc). In alternative embodiments the first reflective layer 206 and second reflective layer 208 respectively comprises: lanthanum (La) and boron carbide ($B_4C$), molybdenum (Mo) and yttrium (Y), silicon carbide (SiC) and silicon (Si), silicon carbide (SiC) and magnesium (Mg), silicon (Si) and scandium (Sc), silicon (Si) and gadolinium (Gd), hafnium oxide ($HfO_2$) and silicon dioxide ($SiO_2$), titanium dioxide ($TiO_2$) and silicon dioxide ($SiO_2$). In one or more embodiments of the disclosure, the reflective multilayers of the second distributed Bragg reflector (DBR) 209 are fabricated by deposition, such as physical vapor deposition (PVD), ion beam deposition (IBD), (chemical vapor deposition) CVD and atomic layer deposition (ALD).

The reflective multilayers of the second DBR 209 according to one or more embodiments, comprises a structure that is reflective to the light having a wavelength in a range of from 50 nm to 50 µm or in a range of from 100 nm to 50 µm. The multilayers include alternating reflective layers of the first reflective layer 206 and the second reflective layer 208. The first reflective layer 206 and the second reflective layer 208 can be formed from a variety of materials that reflect light having a wavelength in a range of from 50 nm to 50 µm. In an embodiment, the first reflective layer 206 and the second reflective layer 208 are formed from silicon and molybdenum. In other embodiments, the alternating layers can be formed from other materials or have other internal structures.

The first reflective layer 206 and the second reflective layer 208 can have a variety of structures. In an embodiment, both the first reflective layer 206 and the second reflective layer 208 are formed with a single layer, multiple layers, a divided layer structure, non-uniform structures, or a combination thereof.

In an embodiment, each of the alternating reflective layers (first reflective layer 206 and second reflective layer 208) has dissimilar optical constants for the wavelength of the light used for the measurement. The alternating layers provide a resonant reflectivity when the period of the thickness of the alternating layers is one half the wavelength of the incident light used for the measurement.

The physical dimensions of the first reflective layer 206 and second reflective layer 208 of the second DBR 209 are precisely controlled to increase reflectivity. In an embodiment, the first reflective layer 206, such as a layer of silicon, has a thickness of 4.1 nm. The second reflective layer 208, such as a layer of molybdenum, has a thickness of 2.8 nm. In one or more embodiments, the thickness of the layers dictates the peak reflectivity wavelength of the second DBR 209. If the thickness of the layers is incorrect, the reflectivity at the desired wavelength 13.5 nm can be reduced.

In an embodiment, the second DBR 209 has a reflectivity of greater than 20% for the measured wavelength range, for example, in a range of from 50 nm to 50 µm or in a range of from 100 nm to 50 µm.

In one or more embodiments of the disclosure, the material film 216 is disposed directly on the second light probe 212. In some embodiments, the material film 216 has a refractive index (n) and thickness tin a range of from 1 nm to 1000 nm and a light absorption coefficient of less than 100 $cm^{-1}$ at the measured wavelength range, for example, in a range of from 50 nm to 50 µm or in a range of from 100 nm to 50 µm, or smaller ranges within these ranges. material film The material film is fabricated by deposition, such as physical vapor deposition (PVD), ion beam deposition (IBD), (chemical vapor deposition) CVD and atomic layer deposition (ALD). In exemplary embodiments, the material film comprises tantalum or tantalum nitride.

In one or more embodiments of the disclosure, first light probe 210 is disposed on the material film 216. In exemplary embodiments of the disclosure, the first light probe 210 comprises a first distributed Bragg reflector (DBR) 207 which reflects light having a wavelength in a range of from 50 nm to 50 µm. In some embodiments, the first light probe comprises reflective multilayers ranging from 5-20 bilayers or 10 to 40 total layers. In one or more embodiments the first DBR of first light probe 210 comprises a lower number of bilayers and multilayers than the second DBR of second light probe 212, or stated another way, the second DBR of the second light probe 212 comprises a greater number of bilayers and multilayers than the first DBR of the first light probe 210. In an exemplary embodiment of the disclosure, the first DBR 207 comprises bilayers a first reflective layer 203 (e.g., molybdenum (Mo)) and a second reflective layer 205 (e.g., silicon (Si)). In one embodiment, the first reflective layer 203 comprises tungsten (W) and the second reflective layer 205 comprises boron carbide ($B_4C$). In other embodiments, other combinations of materials can interchangeably be used to form the first reflective layer 203 and the second reflective layer 205. For example, in one embodiment, boron carbide ($B_4C$) can be the first reflective layer 203 and tungsten (W) can comprise of the second reflective layer 205. In another embodiment, the first reflective layer 206 and the second reflective layer can respectively comprise chromium (Cr) and scandium (Sc). In alternative embodiments the first reflective layer 203 and second reflective layer 205 respectively comprises: lanthanum (La) and boron carbide ($B_4C$), molybdenum (Mo) and yttrium (Y), silicon carbide (SiC) and silicon (Si), silicon carbide (SiC) and magnesium (Mg), silicon (Si) and scandium (Sc), silicon (Si) and gadolinium (Gd), hafnium oxide ($HfO_2$) and silicon dioxide ($SiO_2$), titanium dioxide ($TiO_2$) and silicon dioxide ($SiO_2$). In one or more embodiments of the disclosure, the reflective multilayers of the first distributed Bragg reflector (DBR) 207 are fabricated by deposition, such as physical vapor deposition (PVD), ion beam deposition (IBD), (chemical vapor deposition) CVD and atomic layer deposition (ALD).

The reflective multilayers of the first DBR 207 according to one or more embodiments comprise a structure that is reflective to light having a wavelength in a range of from 50 nm to 50 µm. The multilayers include alternating reflective layers of the first reflective layer 203 and the second reflective layer 205. The first reflective layer 203 and the second reflective layer 314 can be formed from a variety of materials that reflect light having a wavelength in a range of from 50 nm to 50 µm. In an embodiment, the first reflective layer 203 and the second reflective layer 205 are formed from silicon and molybdenum, respectively. Although the layers are shown as silicon and molybdenum, the alternating layers can be formed from other materials or have other internal structures.

The first reflective layer 203 and the second reflective layer 205 can have a variety of structures. In an embodiment, both the first reflective layer 203 and the second reflective layer 205 are formed with a single layer, multiple layers, a divided layer structure, non-uniform structures, or a combination thereof.

In an embodiment, each of the alternating reflective layers (first reflective layer 203 and second reflective layer 205) has dissimilar optical constants for the extreme ultraviolet light. The alternating layers provide a resonant reflectivity when the period of the thickness of the alternating layers is one half the wavelength of the light having a wavelength in a range of from 50 nm to 50 µm.

The physical dimensions of the first reflective layer 203 and second reflective layer 205 layers of the first DBR 207 are precisely controlled to increase reflectivity. In an embodiment, the first reflective layer 203, such as a layer of silicon, has a thickness of 4.1 nm. The second reflective layer 205, such as a layer of molybdenum, has a thickness of 2.8 nm. In one or more embodiments, the thickness of the layers dictates the peak reflectivity wavelength of the first DBR 207. If the thickness of the layers is incorrect, the reflectivity at the desired wavelength 13.5 nm can be reduced.

In an embodiment, the first DBR 207 has a reflectivity of greater than 10% for the measured wavelength range, for example, in a range of from 50 nm to 50 µm or in a range of from 100 nm to 50 µm.

As shown in FIG. 2, the light source 220 directs incident light 221, for example having a wavelength in a range of from 50 nm to 50 µm or in a range of from 100 nm to 50 µm to the substrate at angle θ with respect to a plane normal to the surface of the substrate 202. A first light beam 222 is reflected from the first light probe 210 and is detected by the light detector 224. A second light beam is transmitted through the material film 216 and is reflected from the second light probe 212 and is detected by the light detector 224.

In one or more embodiments, the system or apparatus 200 comprises a controller 250 that communicates with the light source 220 and the light detector 224 via either a wired or wireless connection. The controller 250 according to one or more embodiments comprises a processor 252, a memory 254 coupled to the processor, input/output devices coupled to the processor 252, and support circuits to provide communication between the different components of the system or apparatus, namely the EUV light source 220 and the light detector 224. Processes to operate the system or apparatus 200 may generally be stored in the memory as a software routine that, when executed by the processor, causes the system or apparatus 200 to perform methods described in the present disclosure. The software routine may also be stored and/or executed by a second processor (not shown) that is remotely located from the hardware being controlled by the processor. Some or all of the methods of the present disclosure may also be performed in hardware. As such, the methods described in this disclosure are implemented in software and executed using a computer system, in hardware as, e.g., an application specific integrated circuit or other type of hardware implementation, or as a combination of software and hardware. The software routine, when executed by the processor, transforms the general purpose computer into a specific purpose computer (controller) that controls the chamber operation such that the processes are performed.

The memory 254 of one or more embodiments includes one or more of transitory memory (e.g., random access memory) and non-transitory memory (e.g., storage) and the memory of the processor may be one or more of readily available memory such as random access memory (RAM), read-only memory (ROM), floppy disk, hard disk, or any other form of digital storage, local or remote. The memory can retain an instruction set that is operable by the processor to control parameters and components of the system. The support circuits are coupled to the processor for supporting the processor in a conventional manner. Circuits may include, for example, cache, power supplies, clock circuits, input/output circuitry, subsystems, and the like.

In one or more embodiments, the controller 250 executes instructions to conduct measurement of the refractive index of the material film 216 of the system or apparatus 200. The controller 250 sends a control signal to direct the incident light 221 from the light source 220 toward the first light probe, and the light detector is activated to detect the total reflected light comprising the first light beam 222 and second light beam 223. The total reflected light comprising the first light beam 222 and the second light beam captured by the light detector 224 produces a spectrum of reflectance over a range of wavelengths for the material film 216 having a particular thickness t. In one or more embodiments, several measurements are obtained with the same material film composition and material film configuration sandwiched between the first light probe and the second light probe, but each measurement comprises a material film 216 having a different thickness t. The processor 252 executes the instructions to conduct the measurements, and the measurements are stored in the memory 254. The processor 252 then calculates the refractive index using the equation described below.

Figure 3:
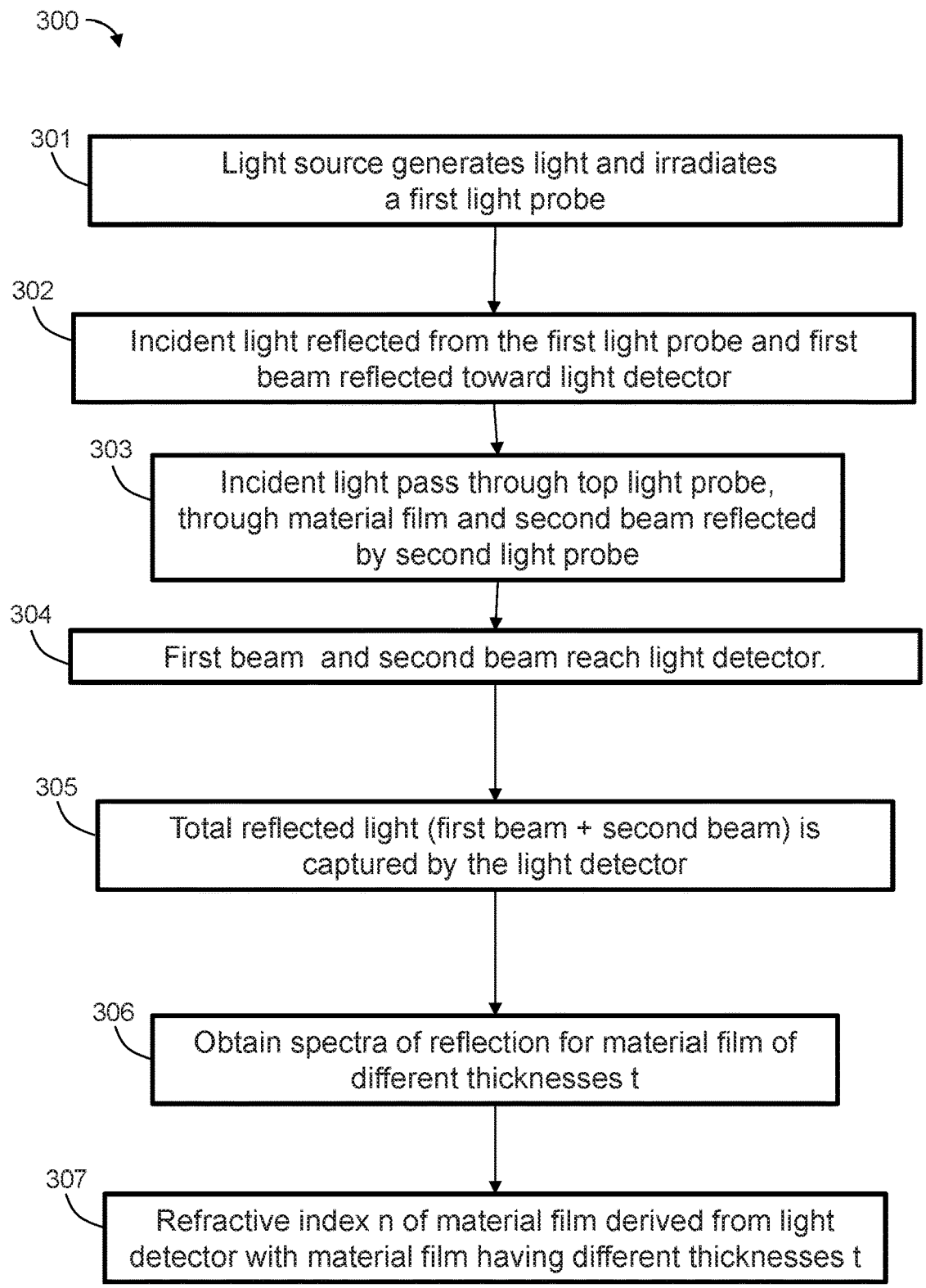
FIG. 3 illustrates an embodiment a method for measuring refractive index of an absorber of material film.

Referring now to FIG. 3, another aspect of the disclosure pertains to a method 300 of measuring refractive index n of a material film 216. The light in some embodiments is at a specific wavelength, for example, greater than 50 nm to 50 µm or greater than 50 µm and less than 50 µm and specific wavelength ranges within these ranges. In an exemplary embodiment of a method, at block 301, a light source 220 generates incident light 221 light having a wavelength in a range of, for example, in a range of from 50 nm to 50 µm or in a range of from 100 nm to 50 µm, either at a specific wavelength or over a range of wavelengths and irradiates a first light probe 210, which is in contact with a material film 216, and which material film is in contact with a second light probe 212. At block 302, incident light 221 is reflected from the first light probe 210, and a first light beam 222 is reflected toward the light detector 224. At block 303, the incident light 221 passes through first light probe 210 and the material film 216 towards the second light probe 212. The incident light 221 is then reflected by second light probe 212, and a second light beam 223 is reflected toward the light detector 224. At block 304, first light beam 222 and second light beam 223 reach light detector 224. In some embodiments, the first light beam 222 and the second light beam 223 interfere with each other. At block 305, the first light beam 222 and second light beam 223 comprises of the total reflected light, and the total reflected light comprising the first light beam 222 and second light beam 223 is captured by the light detector 224. The total reflected light comprising the first light beam 222 and the second light beam captured by the light detector 224 produces a spectrum of reflectance over a range of wavelengths for the material film 216 having a particular thickness t. In one or more embodiments, several measurements are obtained with the same material film composition and material film configuration sandwiched between the first light probe and the second light probe, but each measurement comprises a material film 216 having a different thickness t. In such embodiments, after series of measurements. At block 306, a spectra of reflection is obtained for the material film 216 having different thickness t values (t1, t2, t3 etc.), where t1, t2, and t3 are not equal. In some embodiments, measurements are made on a material film 215 having three different thickness values. In one or more embodiments, 3, 4, 5, 6, 7, 8, 9, 10, 11, 12, 13, 14, 15, 16, 17, 18, 19, 20, 21, 22, 23, 24, or 25 measurements are made on a material film, where each measurement is made on a material film thickness t that is different than the other material film thicknesses. At block 307, the refractive index n of the material film 216 can be derived from spectra of reflection from light detector 124 with different material thickness t.

In a specific embodiment of the disclosure, the refractive index n of the material film 216 is derived by obtaining a reference periodic thickness $t_{p,n=1}$ for a material film with a refractive index n of 1. In an exemplary embodiment of the disclosure, the material film used as the reference periodic thickness is silicon.

Figure 4:
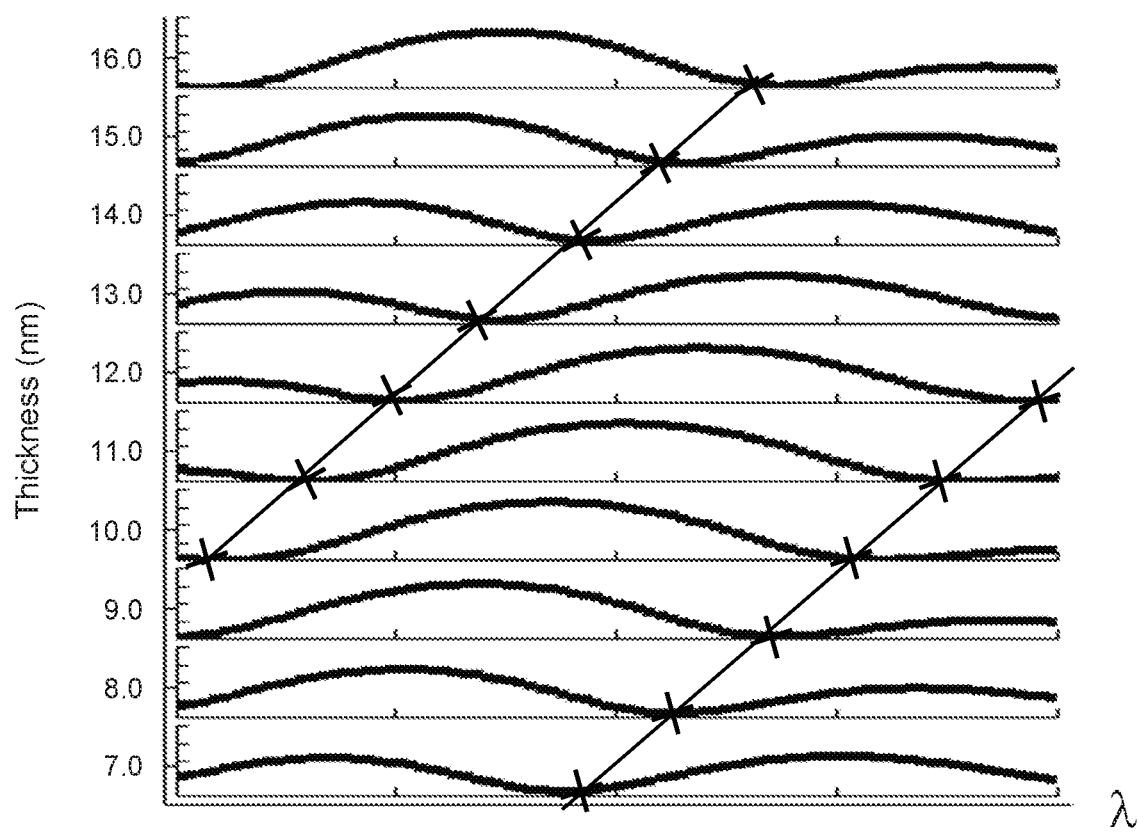
FIG. 4 is a graph of thickness versus wavelength for a material film that can be used according to an embodiment of the disclosure.

Referring now to FIG. 4, according to one or more embodiments of the disclosure, the method includes obtaining a periodic thickness ($t_p$) for the reference material film, which in some embodiments is silicon, and therefore $t_{p,Si}$ and n=1. The method according to some embodiments further comprises determining the wavelength (nm) where the spectra of reflection shows minimum light intensity for each absorber thickness t (nm) as plotted in FIG. 4. In one example, the range of thicknesses for the reference material film is from 7 nm to 16 nm over a wavelength range of about in a range of from 50 nm to 50 μm or in a range of from 100 nm to 50 μm. As shown in FIG. 4, the minimum light intensity can occur at different wavelength values. Then, a plot of wavelength versus thickness is generated, and from the generated plot of wavelength versus thickness, a thickness value at a particular wavelength can be obtained or determined.

Figure 5:
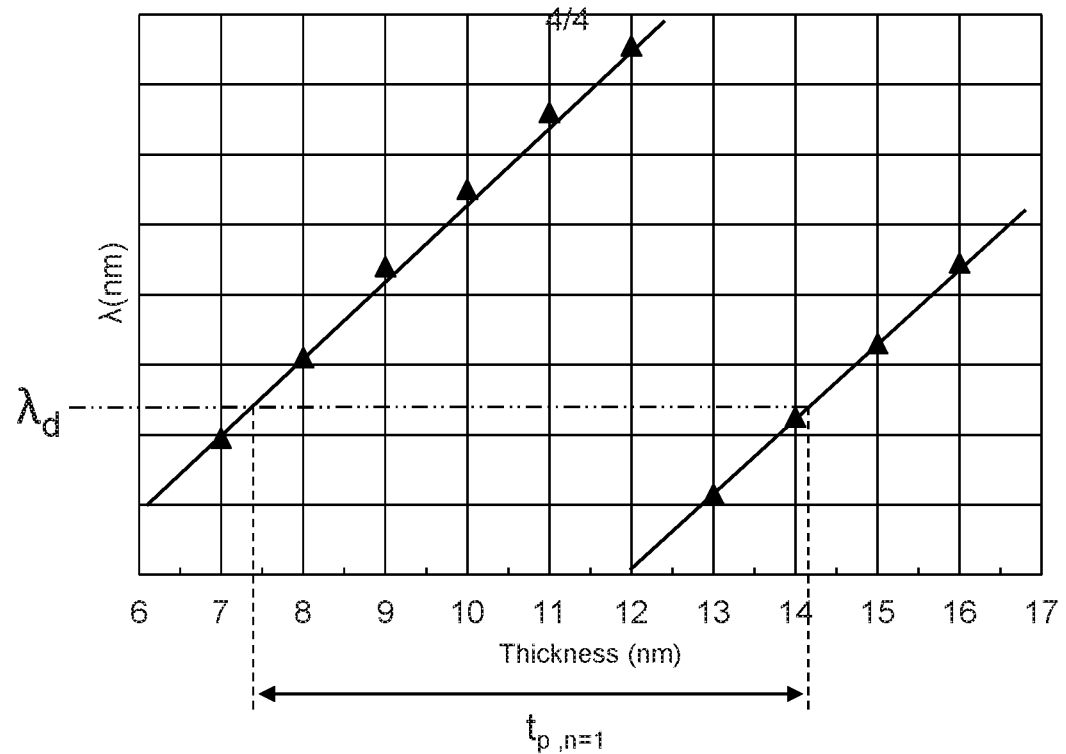
FIG. 5 is a graph of wavelength versus thickness for a material film that can be used according to an embodiment of the disclosure.

Then, according to one or more embodiments, as shown in FIG. 5, the wavelength over a range of wavelengths (e.g., in a range of from 50 nm to 50 μm or in a range of from 100 nm to 50 μm) is plotted as a function of thickness t for the reference material film, which in some embodiments, is a silicon material film. Reference periodic thickness $t_{p,n=1}$ is determined by the difference of the same wavelength. In one or more embodiments, a periodic thickness $t_p$ is determined for a particular wavelength. Referring to the plot in FIG. 5, the reference periodic thickness for a silicon material film $t_{p,Si}$ is determined to be $t_{p,n=1}$=7.4 nm at a wavelength of $\lambda_d$ nm for a reference material film having a refractive index n=1 at the measured wavelengths. In the embodiment shown in FIG. 5, there is a linear relationship between the function of the wavelength over the thickness of the material film. Therefore, the period thickness $t_p$ can also be found at different wavelengths over a range of measure wavelengths. For example, the period thickness $t_{p,n=1}$ is determined as approximately 6.8 nm by the difference of the thickness at the wavelength of $\lambda_d$.

Figure 6:
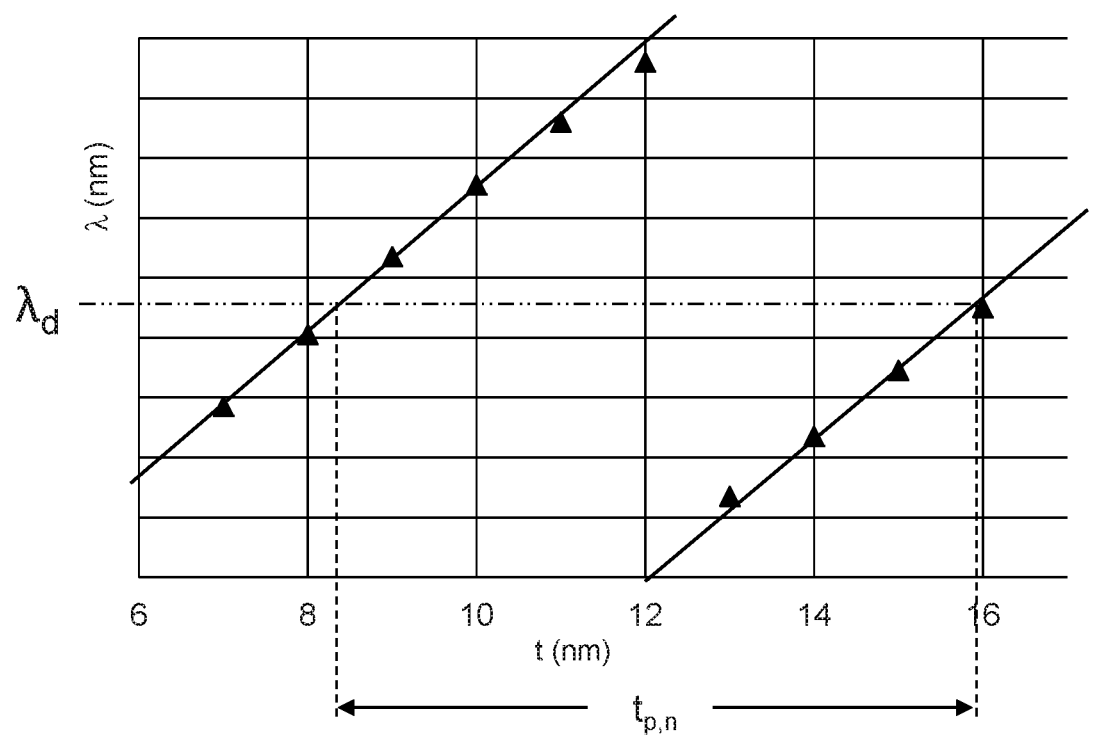
FIG. 6 is a graph of wavelength versus periodic thickness for a material film that can be used according to an embodiment of the disclosure.

Referring now to FIG. 6 the periodic thickness is determined for a material film 216 by plotting wavelength as a function of thickness t for a particular wavelength $\lambda_d$. The periodic thickness at a wavelength of $\lambda_d$ is obtained as or determined to be $t_p$=7.6 nm. There is a linear relationship between the function of the wavelength over the thickness of the material film. Therefore, the period thickness $t_p$ is determined at different wavelengths over a range of wavelengths.

After the periodic thickness of particular material film has been determined or obtained for a particular wavelength by plotting a range of wavelengths as a function of thickness t, the refractive index is calculated. The refractive index n of the material film 216 is calculated using the following equation, where θ is the angle shown in FIG. 2 of the incident light 221 to the substrate with respect to a plane 202n normal to the surface 202s of the substrate 202

$$n_{material} = 1 - \frac{\lambda_d \times \cos(\theta)}{2} \left| \frac{1}{t_{p,n=1}} - \frac{1}{t_{p,n}} \right|.$$

Embodiments of the disclosure provide a system or apparatus and a method to measure refractive index n of material films. Embodiments address one or more problems associated with current ellipsometry measurement systems and methods for measuring refractive index n of materials, which tend to exhibit difficulty in the measurement thin films having a thickness less than 10 nm. Embodiments also do not require oblique incident angle of the incident light for measuring the refractive index (n) (e.g. 70-80° in semiconductor field) typically required by ellipsometry systems. Embodiments disclosed herein provide a device and a method configured to measure refractive index n of thin films having a wide range of thickness (e.g., ranging from 1 nm to 50 μm) and for thin films having a wide light absorption coefficient (e.g., ranging from 10 cm$^{-1}$ to 10$^5$ cm$^{-1}$) at measured wavelengths in a range of from 50 nm to 50 μm or in a range of from 100 nm to 50 μm, and a flexible incident light angle (e.g. ranging from 0° to 85°)The system and method provide an accurate measurement of refractive index for material films.

The methods described above can be executed by a non-transitory computer-readable storage medium including instructions, that, when executed by the processor 252 of the controller 250 of the system or apparatus 200 causes the system or apparatus 200 to perform the methods described immediately above.

For example, in one embodiment, a non-transitory computer readable storage medium includes instructions that causes a processor 252 of a controller of the system or apparatus 200 causes the system or the apparatus 200 to send a control signal to direct the incident light 221 from the light source 220 toward the first light probe, and the light detector is activated to detect the total reflected light comprising the first light beam 222 and second light beam 223. The total reflected light comprising the first light beam 222 and the second light beam captured by the light detector 224 produces a spectrum of reflectance over a range of wavelengths for the material film 216 having a particular thickness t. In one or more embodiments, several measurements are obtained with the same material film composition and material film configuration sandwiched between the first light probe and the second light probe, but each measurement comprises a material film 216 having a different thickness t. The processor 252 executes the instructions to conduct the measurements, and the measurements are stored in the memory 254. The processor 252 then calculates the refractive index n of material film 216 is calculated using the following equation, where θ is the angle shown in FIG. 2 of the incident light 221 to the substrate with respect to a plane 202n normal to the surface 202s of the substrate 202

$$n_{material} = 1 - \frac{\lambda_d \times \cos(\theta)}{2} \left| \frac{1}{t_{p,n=1}} - \frac{1}{t_{p,n}} \right|,$$

where $n_{material}$ is the measured refractive index of the material, $\lambda_d$ is wavelength in nm, $t_{p,\ n=1}$ is a reference periodic thickness $t_{p,n=1}$ for a reference material film with a refractive index n of 1 at the wavelength $\lambda_d$ and $t_{p,n}$ is the thickness of the material measured.

Processes may generally be stored in the memory as a software routine that, when executed by the processor, causes the system or apparatus 200 to perform methods of the present disclosure. The software routine may also be stored and/or executed by a second processor (not shown) that is remotely located from the hardware being controlled by the processor. Some or all of the methods of the present disclosure may also be performed in hardware. As such, the process may be implemented in software and executed using a computer system, in hardware as, e.g., an application specific integrated circuit or other type of hardware implementation, or as a combination of software and hardware. The software routine, when executed by the processor, transforms the general purpose computer into a specific purpose computer (controller) that controls the chamber operation such that the processes are performed.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. An apparatus to measure a refractive index of a material film, the apparatus comprising:
   a first light probe comprising a first distributed Bragg reflector which reflects light having a wavelength in a range of from 50 nm to 50 µm;
   a second light probe comprising a second distributed Bragg reflector which reflects light having a wavelength in a range of from 50 nm to 50 µm;
   the material film having a thickness t disposed between the first light probe and the second light probe, the first light probe, the material film and the first light probe on a substrate having a surface;
   a light source positioned at an angle θ with respect to a plane normal to a surface the substrate and configured to direct incident light having a wavelength in a range of from 50 nm to 50 µm toward the first light probe;
   a light detector positioned to detect a first light beam reflected from the first light probe and a second light beam transmitted through the material film and reflected from the second light probe, the light detector configured to measure light having a wavelength in a range of from 50 nm to 50 µm; and
   a processor configured to determine the refractive index of the material film.

2. The apparatus of claim 1, wherein the first distributed Bragg reflector comprises reflective multilayers and the second distributed Bragg reflector comprises reflective multilayers, and the second distributed Bragg reflector comprises a greater number of reflective multilayers than the first distributed Bragg reflector.

3. The apparatus of claim 2, wherein the reflective multilayers of the first distributed Bragg reflect comprises a range of from 5-20 bilayers and the reflective multilayers of the second distributed Bragg reflector comprise a range of 10-40 bilayers.

4. The apparatus of claim 3, wherein the bilayers comprises alternating layers of molybdenum and silicon.

5. The apparatus of claim 1, wherein the processor determines the refractive index of the material film derived from a periodic thickness of a reference material film and a periodic thickness of the material film.

6. The apparatus of claim 5, wherein the processor is part of a controller that controls the light source to direct light at the first light probe over a range of wavelengths and controls the light detector to receive the first light beam and the second light beam over the range of wavelengths for the reference material film and the material film.

7. The apparatus of claim 6, wherein the thickness t is in a range of from 1 nm to 50 µm.

8. The apparatus of claim 7, wherein the processor determines the refractive index of the material film based on an equation $$n_{material} = 1 - \frac{\lambda_d \times \cos(\theta)}{2} \left| \frac{1}{t_{p,n=1}} - \frac{1}{t_{p,n}} \right|$$

where $n_{material}$ is the measured refractive index of the material film, $\lambda_d$ is wavelength in nm, $t_{p,\ n=1}$ is a reference periodic thickness $t_{p,n=1}$ for a reference material film with a refractive index n of 1 at the wavelength $\lambda_d$ and $t_{p,n}$ the thickness of the material film.

9. The apparatus of claim 8, wherein θ is in a range of from 0 degrees to 85 degrees.

10. A method of measuring a refractive index of a material film, the method comprising:
    positioning a light source with respect to a substrate having formed on a surface of the substrate:
    a first light probe comprising a first distributed Bragg reflector which reflects greater than 20% of light having a wavelength in a range of from 50 nm to 50 µm;
    a second light probe comprising a second distributed Bragg reflector which reflects greater than 10% of light having a wavelength in a range of from 50 nm to 50 µm; and
    a material film having a thickness t disposed between the first light probe and the second light probe, the first light probe, the film of material and the first light probe on a substrate having a surface;

directing incident light having a wavelength in a range of from 50 nm to 50 μm toward the first light probe, the incident light directed at an angle θ with respect to a plane normal to the surface of the substrate;

detecting light with a light detector positioned to detect a first light beam reflected from the first light probe and a second light beam transmitted through the material film and reflected from the second light probe; and calculating the refractive index of the material film.

11. The method of claim 10, further comprising measuring light intensity received by the light detector over a range of wavelengths and a range of reference material thickness values for a reference material having a known refractive index.

12. The method of claim 11, wherein the thickness of the material film is in a range of from 1 nm to 50 μm and the material film has a light absorption coefficient in a range of from 10 cm$^{-1}$ to 10$^5$ cm$^{-1}$ over the range of wavelengths.

13. The method of claim 11, further comprising measuring light intensity of the material film over the range of wavelengths and a range of material film thickness values.

14. The method of claim 13, further comprising obtaining a periodic thickness of the reference material.

15. The method of claim 14, further comprising obtaining a periodic thickness of the material film.

16. The method of claim 15, wherein the periodic thickness of the material film and the periodic thickness of the reference material is obtained using at least 5 thickness values.

17. The method of claim 15, wherein the reference material comprises silicon.

18. The method of claim 15 wherein calculating the refractive index of the material film utilizes the periodic thickness of the reference material and the material film.

19. The method of claim 15, wherein calculating the refractive index of the material film utilizes an equation $$n_{material} = 1 - \frac{\lambda_d \times \cos(\theta)}{2} \left| \frac{1}{t_{p,n=1}} - \frac{1}{t_{p,n}} \right|$$

where $n_{material}$ is the measured refractive index of the material film, $\lambda_d$ is wavelength in nm, $t_{p,n=1}$ is a reference periodic thickness $t_{p,n=1}$ for a reference material film with a refractive index n of 1 at the wavelength $\lambda_d$ and $t_{p,n}$ is the thickness of the material film.

20. A non-transitory computer-readable storage medium including instructions, that when executed by a processor of an apparatus to measure the refractive index of a material film, causes the apparatus to perform operations of:

positioning a light source with respect to a substrate having formed on a surface of the substrate:

a first light probe comprising a first distributed Bragg reflector which reflects light having a wavelength in a range of from 50 nm to 50 μm;

a second light probe comprising a second distributed Bragg reflector which reflects light having a wavelength in a range of from 50 nm to 50 μm; and the material film having a thickness t between the first light probe and the second light probe, the first light probe, the material film and the first light probe on a substrate having a surface;

directing incident light having a wavelength in a range of from 50 nm to 50 μm toward the first light probe, the incident light directed at an angle θ with respect to a plane normal to the surface of the substrate;

detecting light with a light detector positioned to detect a first light beam reflected from the first light probe and a second light beam transmitted through the material film and reflected from the second light probe; and calculating the refractive index of the material film.

\* \* \* \* \*